July 16, 1963  J. R. V. MARTINY  3,097,424
PROCESS FOR PROTECTING AND LUBRICATING MECHANICAL ASSEMBLIES
Filed Oct. 6, 1958
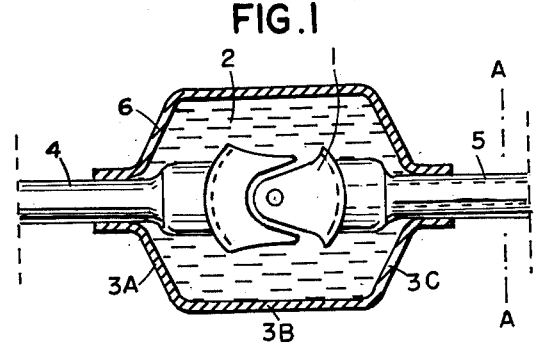
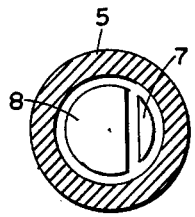 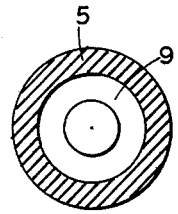
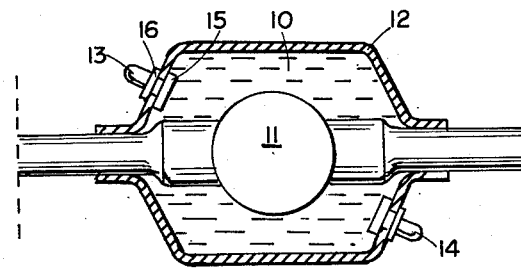
INVENTOR.
Jean R. V. Martiny
BY Maxwell E. Sparrow 3,097,424
PROCESS FOR PROTECTING AND LUBRICATING MECHANICAL ASSEMBLIES
Jean R. V. Martiny, 10 Rue Pavee, Rouen, Seine-Maritime, France
Filed Oct. 6, 1958, Ser. No. 765,630
Claims priority, application France Oct. 5, 1957
12 Claims. (Cl. 29—460)

My invention concerns an improved process for protecting and lubricating mechanical assemblies, namely hinged and/or sliding assemblies.

A process and means for protecting and lubricating of the above referred type are the subject of the following patents:

France, 1,057,428, May 28, 1952
France (Addition), 63,634, Dec. 24, 1952
United States, 2,795,038, June 11, 1957

This process and these means are namely characterized by the steps of enveloping the assembly in a plastic lubricant, the rigidity of which may be increased by cooling, and hermetically enclosing the said assembly by applying an elastic sheath over the said lubricant. The sheath-forming material is preferably applied by spraying.

Improvements to this process are the object of my present invention.

My invention chiefly consists in making the elastic sheath, enclosing the plastic lubricant, with synthetic rubber, presented in the way of an aqueous dispersion or latex.

My invention also consists in using means permitting a circulation and a renewal of the lubricant, together with the said elastic sheath.

My invention further consists in some other arrangements, as mentioned hereafter, and preferably used together with the main arrangements as indicated above.

My invention particularly covers certain methods of application and realization of the said arrangements and also of the assemblies of the subject kind protected and lubricated in this manner, the components and tools appropriate to make them, and the units incorporating such assemblies.

By way of example, and for providing a better understanding of my invention, I will now disclose the manner of executing the same in a particular embodiment thereof as illustrated in a non-limiting sense in the accompanying drawing. In said drawing:

FIGURE 1 is a partial vertical and longitudinal view and a partial longitudinal section of a Cardan-joint protected and lubricated according to my invention.

FIGURE 2 is an enlarged view of the section of said Cardan-joint by the plane A—A of FIGURE 1.

FIGURE 3 is an enlarged view of a variant of the section of the Cardan-joint by the plane A—A of FIGURE 1.

FIGURE 4 represents, schematically and partially in longitudinal section, a joint protected and lubricated according to my invention, the protecting sheath of said joint being provided with elements insuring the renewal of the lubricant.

If it is intended to protect and lubricate an assembly according to my invention, one proceeds as follows:

The assembly to be protected being constituted by a Cardan-joint 1 is wrapped, according to the known technique, in a plastic lubricant 2 such as grease. Grease handling can be rendered easier by the use of spatulas or other tools, slightly heated and preferably inoxidizable. In order to obtain the desired shape more easily for the profile 3A, 3B, 3C of the wrapping 2, it will be advantageous to use a gauge when this use is possible. If, as in the present case, the wrapping is of revolution around the assembly to be protected, a mere rotation of the assembly or gauge will be sufficient to give the plastic lubricant the desired shape readily.

It will be also possible to use a brush in order to give the desired shape for the outer surface of the wrapping 2.

In order to maintain the protecting sheath further by sticking on the surfaces of the Cardan shafts 4 and 5, which come out from wrapping 2, the said surfaces are cleared from lubricant which may be present thereon. This cleaning may be carried out by means of a grease solvent such as trichlorethylene. A sticking product is then applied on these cleaned surfaces, the same permitting the adherence of the synthetic rubber of the sheath to the material of the shafts 4 and 5. In the usual case, when the shafts 4 and 5 are made of metal, particularly of steel, a synthetic rubber solution in a ketone may be used as sticking product. In order to increase the adherence of the sticking product, the sticking surfaces of the shafts 4 and 5 may be previously rendered slightly rugose or treated by any known appropriate means, such as phosphatation.

After said preparation, the sheath 6 is constituted on the outer surface of the wrapping 2 and on the sticking surfaces of the shafts 4 and 5 by depositing one or more layers of possibly different synthetic rubbers presented in the form of an aqueous dispersion or latex.

This form of presentation offers this advantage that the water, the vehicle of the synthetic rubber has no practical effect on the lubricating wrapping 2. It is not the same with synthetic rubber presented in the form of a solution in an organic solvent, this solvent acting more or less on the wrapping lubricant.

The manner of making of the sheath 6 by using a latex of particular synthetic rubber is going to be described now. The said manner is given only as an example and the use of other dispersions or latices of synthetic rubber or the use of other additions to these dispersions or the modification of the contents of these products will remain within the limits of my invention.

The synthetic rubber dispersion used in the example of sheath making hereafter selected is a latex of a butadiene-acrylonitrile copolymer with a high nitrile content. This latex contains 40 percent of dry synthetic rubber which is susceptible to be treated by vulcanization. If such a vulcanization is desired, curing agents should be added to the latex before it is used. Thickeners can also be incorporated to the latex, the said thickeners facilitate the making of the sheath.

To the above mentioned latex, the pH of which is adjusted at about 9 by adding ammonium hydroxide, are incorporated the following products, the contents of which are indicated by percentages in relation with the weight of dry synthetic rubber, contained in the latex:

| | Percent |
|---|---|
| Sodium carboxymethyl cellulose | 0.30 |
| Dispersible zinc oxide | 2.75 |
| Dispersible sulfur | 1.83 |
| Zinc ethylphenyldithiocarbamate | 0.91 |

This compound is less fluid than pure latex and the synthetic rubber obtained after drying becomes vulcanized with time, preferably through a thermic treatment.

To make the sheath 6, this compound is preferably projected with spray-gun on the outer surface of the wrapping 2 and the sticking surfaces of the shafts 4 and 5, in order to constitute a covering without a solution of continuity. The air pressure for spraying may be low, ranging from approximately two to seven pounds per square inch. In order to accelerate the drying of the sprayed compound, it is advantageous to blow hot air, for example at a temperature of approximately 60° C. (=140° F.), on the surface of the sheath in proportion as the latter is constituted.

After complete covering up of the wrapping 2 and of the sticking surfaces of the shafts 4 and 5 with a layer of synthetic rubber of sufficient depth and after thorough drying up of this layer, the sheath 6 can be subjected to a vulcanizing thermic treatment, preceded or not by a washing of the sheath with water.

The aforesaid thermic treatment is preferably operated in blowing hot air at a known temperature on the outer surface of the sheath during a determinate time.

In the example that has been chosen, the sheath 6, covering a Cardan-joint and its lubricating wrapping and having the above mentioned composition, has been washed with water and then treated during 30 minutes at a temperature increasing from 90° C. (=194° F.) to 100° C. (=212° F.).

After this vulcanizing treatment, the sheath has been tested in causing the Cardan-joint which was protected by the said sheath to turn, the shafts 4 and 5 of this Cardan-joint forming, between themselves, an angle of 15 degrees. In this angular condition, the Cardan-joint has accomplished 17,600,000 runs at a speed of 365 runs per minute and then 2,698,000 runs at a speed of 600 runs per minute. The sheath has thus endured 20,298,000 cycles of stress without showing any lubricant leakage at the stickings or through cracking of the sheath.

Other good results have been obtained with the same latex, without adding ammonium hydroxide or thickeners, but with the addition of:

| | Percent |
|---|---|
| Dispersible zinc oxide | 5.06 |
| Dispersible sulfur | 2.01 |
| Zinc ethylphenyldithiocarbamate | 1.00 |

The sheaths made with this compound have been subjected to thermic treatments from 15 to 30 minutes at temperatures comprised within 95° C. (=203° F.) and 140° C. (=284° F.).

It may happen, during the movements of the protected assembly, that certain parts of said assembly are brought into contact with the internal surface of the sheath. It may be so for a Cardan-joint, such as the Cardan-joint 1, if the shafts 4 and 5 form an important angle between themselves. If the parts of the assembly, thus brought into contact with the sheath, are abrasive or cutting, there results therefrom a premature wear of the sheath, this wear is all the more pernicious as it is produced inside in an invisible manner. In order to remedy this disadvantage, it will be proceeded, before the making of the lubricant wrapping, to an appropriate coating of said abrasive or cutting parts of the assembly. Such a protecting coating may be obtained by sticking on the aforesaid parts of sections made with material which must not be very hard and must resist lubricant, for instance sections made with synthetic rubber. This protecting coating may also be made by means of covering the above mentioned parts with a synthetic rubber latex, eventually thickened, with or without an interposed sticking product. For this particular purpose, good results have been obtained by adding to the above mentioned latex on the one hand ammonium hydroxide for adjusting the pH at about 9, and on the other hand the following products:

| | Percent |
|---|---|
| Sodium carboxymethyl cellulose | 2.78 |
| Dispersible zinc oxide | 5.48 |

Before applying this compound, which is particularly viscous, a sticking layer of synthetic rubber in a ketone solution had been deposited on the parts of the assembly to be coated.

As well as for the making of the sheath as for the making of the protecting coating, it is possible to add, to the dispersion or latex of synthetic rubber, synthetic rubber in a form more or less divided; this additional rubber may be deposited, as a powder by instance, on the lubricating wrapping or on the sheath at any stage of its making.

The existence of a protecting sheath, such as the one above described, permits to consider a number of dispositions in order to improve the lubrication of mechanical assemblies thus protected.

As has been mentioned on the French Patent No. 1,057,428 and on the U.S. Patent No. 2,795,038, the relative movements of the assembly may be used for establishing a circulation of lubricant. If the trunnions, bearings or slides of an assembly necessitate a lubrication under pressure, the existence of a sheath permits to provide a pump, giving the required pressure and actuated, through a cam for instance, by the relative movements of the assembly.

It is also possible to obtain a circulation of lubricant in providing its supply and outlet through certain elements of the assembly, for example through one shaft or the two shafts of a cardan-joint. The supply and outlet are only effected through one shaft, it is advantageous that the outlet pipe section should be larger than that of the supply pipe. Thus the shaft 5 of the cardan-joint 1 will be eventually tubular and receive inside the tube thus formed two profiled pipes 7 and 8, pipe 7 supplying lubricant and pipe 8 insuring its evacuation. As a variant, lubricant can be supplied through a pipe 9 and evacuated between the outside of this pipe 9 and the inside of the tubular shaft 5.

It is further possible to make the partial or total renewal of the lubricant enclosed in the sheath. In order to obtain this result, one or, better, two tubular elements 13 and 14 are placed on the lubricating wrapping 10 of the joint 11, before making the sheath 12. These elements are preferably provided with a bed-plate 15 and a flange 16 and with a valve or a plug not represented. These tubular elements, which may be made with any material, plastic material for instance, are embedded in the material of the sheath 12 when the same is made. One extremity of these elements is afterwards disengaged in order that such extremity may remain apparent. The lubricant which has been used, can be evacuated later through the tubular elements 13 and 14 and replaced by a new lubricant. Experiment has shown that a grease, used for making the wrapping, becomes fluid enough in a sheathed joint having worked during a certain time. Consequently there is no difficulty to determinate the evacuation of the lubricant which has been used, through the element 14, by forcing the new lubricant to enter the sheath 12 through the element 13. If it is necessary, it will be possible to compensate the unbalance, caused by the eventual rotation of the elements 13 and 14, through small balancing weights embedded in the material of the sheath.

It results from the foregoing that by applying the processes as described, a protection and a lubrication of mechanical assemblies may be obtained, namely hinged and/or sliding assemblies, offering numerous advantages as against former processes, among others the non-alteration of the lubricant at the time of the making of the sheath, the possibility of large relative displacements, the improvement of the lubrication conditions.

Of course, the invention is not restricted to the methods of application and realization specifically indicated, it also copolymer of a high nitrile content, said latex containing

What I claim is:

1. A process for protecting and lubricating a joint of relatively movable parts which comprises the steps of wrapping said joint in a grease lubricant upon which ordinary coatings applied by ordinary procedures would not stick, and depositing on said grease lubricant wrapping and on the free ends of said joint, a synthetic rubber in the form of an aqueous dispersion containing curing agents and thickeners, at ambient temperature, in order to make an elastic sheath hermetically enclosing said joint.

2. A process according to claim 1, wherein said sheath is constituted by a plurality of layers of synthetic rubbers presented in the form of aqueous dispersions.

3. A process according to claim 1, said aqueous dispersion consiting of a latex of a butadiene acrylonitrile copolymer with a high nitrile content said latex containing 5.06% dispersible zinc oxide, 2.01% dispersible sulfur and 1.00% zinc ethylphenyldithiocarbamate.

4. A process according to claim 1, wherein said synthetic rubber is deposited by spraying with simultaneous blowing of hot air.

5. A process according to claim 1, wherein said sheath is subjected to a thermic treatment by blowing of hot air.

6. A process according to claim 1, and covering the abrasive or cutting parts of said joint, which may come into contact with the inside of the said sheath.

7. A process according to claim 1, and lubricating said joint under pressure by means actuated by the relative movements of said joint.

8. A process according to claim 1, wherein said joint is lubricated by means of circulation of a lubricant coming in and out through certain elements of said joint.

9. A process according to claim 1, wherein tubular elements are embedded in said sheath at the time of its making in order to permit the renewal of the lubricant.

10. A process according to claim 1, and said aqueous dispersion consisting of a latex of butadiene acrylonitrile copolymer with a high nitrile content, said latex containing curing agents and thickeners consisting of ammonium hydroxide raising the pH value thereof up to 9, and further containing 2.78% sodium carboxymethyl cellulose and 5.48% dispersible zinc oxide.

11. A process according to claim 6, and first depositing a sticking layer of a ketone solution of synthetic rubber on said parts and second depositing said aqueous dispersion of butadiene acrylonitrile copolymer with a high nitrile content, said latex containing as curing agents ammonium hydroxide raising the pH value thereof up to 9, and further containing 2.78% sodium carboxymethyl cellulose and 5.48% dispersible zinc oxide.

12. A process according to claim 1, and said aqueous dispersion consisting of a latex of butadiene acrylonitrile copolymer with a high nitrile content, the pH value of said latex being raised to 9 by adding ammonium hydroxide, said latex containing as curing and thickening agents 0.30% sodium carboxymethyl cellulose, 2.75% dispersible zinc oxide, 1.83% dispersible sulfur and 0.91% zinc ethylphenyldithiocarbamate.

References Cited in the file of this patent

UNITED STATES PATENTS

| | | |
|---|---|---|
| 1,943,631 | Skillman | Jan. 16, 1934 |
| 1,960,956 | Riedel | May 29, 1934 |
| 2,768,091 | Cubberley | Oct. 23, 1956 |
| 2,795,038 | Martiny | June 11, 1957 |
| 2,821,487 | Hummel | Jan. 28, 1958 |
| 2,854,347 | Booth et al. | Sept. 30, 1958 |

FOREIGN PATENTS

| | | |
|---|---|---|
| 18,328 | Australia | July 8, 1935 |